US012750891B2

(12) United States Patent
Jung et al.

(10) Patent No.: US 12,750,891 B2
(45) Date of Patent: Sep. 29, 2026

(54) METHOD AND APPARATUS FOR PERFORMING RANDOM ACCESS IN WIRELESS COMMUNICATION SYSTEM

(71) Applicant: SAMSUNG ELECTRONICS CO., LTD., Suwon-si (KR)

(72) Inventors: Byounghoon Jung, Suwon-si (KR); Anil Agiwal, Suwon-si (KR); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 556 days.

(21) Appl. No.: 18/361,695

(22) Filed: Jul. 28, 2023

(65) Prior Publication Data

US 2024/0040632 A1 Feb. 1, 2024

(30) Foreign Application Priority Data

Jul. 29, 2022 (KR) ........................ 10-2022-0094899

(51) Int. Cl.

| | |
|---|---|
| ***H04W 74/0833*** | (2024.01) |
| ***H04W 52/02*** | (2009.01) |
| ***H04W 72/23*** | (2023.01) |
| ***H04W 74/00*** | (2009.01) |
| ***H04W 76/20*** | (2018.01) |
| ***H04W 76/28*** | (2018.01) |

(52) U.S. Cl.

CPC .................. *H04W 74/0841* (2013.01); *H04W 52/0206* (2013.01); *H04W 52/0216* (2013.01); *H04W 52/0235* (2013.01); *H04W 74/0833* (2013.01); *H04W 76/20* (2018.02); *H04W 72/23* (2023.01); *H04W 74/006* (2013.01); *H04W 76/28* (2018.02)

(58) Field of Classification Search

None

See application file for complete search history.

(56) References Cited

U.S. PATENT DOCUMENTS

| | | | | |
|---|---|---|---|---|
| 12,574,975 | B2 * | 3/2026 | Wu ..................... | H04W 74/006 |
| 2008/0186892 | A1 | 8/2008 | Damnjanovic | |
| 2020/0100179 | A1 | 3/2020 | Zhou | |
| 2020/0154354 | A1 | 5/2020 | Awoniyi-Oteri et al. | |

(Continued)

FOREIGN PATENT DOCUMENTS

| | | | |
|---|---|---|---|
| CN | 110831134 | A | 2/2020 |
| WO | 2021221403 | A1 | 11/2021 |

OTHER PUBLICATIONS

International Search Report and Written Opinion of the International Searching Authority dated Nov. 14, 2023, in connection with International Application No. PCT/KR2023/011078, 7 pages.

(Continued)

*Primary Examiner* — Jutai Kao

(57) ABSTRACT

The disclosure relates to a 5G or 6G communication system for supporting a higher data transmission rate. A method performed by a user equipment (UE) in a wireless communication system includes receiving, from a base station, configuration information related to a network energy saving (NES) mode, receiving, from the base station, a message indicating a performing the NES mode after a random access (RA) is triggered, and identifying whether at least one resource related to the RA and the NES mode overlap based on the configuration information.

20 Claims, 7 Drawing Sheets

(56) References Cited

U.S. PATENT DOCUMENTS

| | | | | |
|---|---|---|---|---|
| 2021/0314862 | A1* | 10/2021 | Xu | H04W 52/0216 |
| 2022/0209920 | A1 | 6/2022 | Wu et al. | |
| 2023/0389120 | A1* | 11/2023 | Babaei | H04W 52/0235 |
| 2024/0023195 | A1* | 1/2024 | Kim | H04W 76/28 |
| 2025/0386226 | A1* | 12/2025 | Liang | H04W 24/10 |

OTHER PUBLICATIONS

Vivo, "Discussions on network energy saving techniques", R1-2203576, 3GPP TSG RAN WG1 #109-e, e-Meeting, May 9-20, 2022, 8 pages.

Supplementary European Search Report dated May 21, 2026, in connection with European Patent Application No. 23847048.8, 13 pages.

* cited by examiner

METHOD AND APPARATUS FOR PERFORMING RANDOM ACCESS IN WIRELESS COMMUNICATION SYSTEM

CROSS-REFERENCE TO RELATED APPLICATION

This application is based on and claims priority under 35 U.S.C. 119 to Korean Patent Application No. 10-2022-0094899, filed on Jul. 29, 2022, in the Korean Intellectual Property Office, the disclosure of which is herein incorporated by reference in its entirety.

BACKGROUND

1. Field

The disclosure relates to operations of a UE and a BS in a wireless communication system and, more particularly, to a method and an apparatus for performing random access by the UE when a network energy saving (NES) mode is configured to reduce power consumption of a communication network.

2. Description of Related Art 5G mobile communication technologies define broad frequency bands such that high transmission rates and new services are possible, and can be implemented not only in “Sub 6 GHz” bands such as 3.5 GHz, but also in “Above 6 GHz” bands referred to as mmWave including 28 GHz and 39 GHz. In addition, it has been considered to implement 6G mobile communication technologies (referred to as Beyond 5G systems) in terahertz (THz) bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (Bandwidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Meanwhile, when an NES mode is configured to reduce power consumption of a communication network in a wireless communication system, a detailed method for performing random access is needed.

The above information is presented as background information only to assist with an understanding of the disclosure. No determination has been made, and no assertion is made, as to whether any of the above might be applicable as prior art with regard to the disclosure.

SUMMARY

Disclosed embodiments provide an apparatus and a method capable of effectively providing a service in a wireless communication system.

According to an embodiment of the disclosure, a method of operating a user equipment (UE) in a wireless communication system includes receiving configuration information of random access (RA) resources for a network energy saving (NES) mode from a base station (BS), triggering an operation of the NES mode, after the operation of the NES mode is triggered, determining whether RA resources for the NES mode overlap resources selected to transmit a first message, based on the received configuration information of the RA resources, and in case that the RA resources for the NES mode overlap the resources for transmitting the first message, cancelling the selection of the resources for transmitting the first message, wherein the first message includes an RA preamble.

Various embodiments of the disclosure provide an apparatus and a method for effectively providing a service in a wireless communication system.

Effects obtainable from the disclosure are not limited to the above-mentioned effects, and other effects which are not mentioned may be clearly understood by those skilled in the art of the disclosure through the following descriptions.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
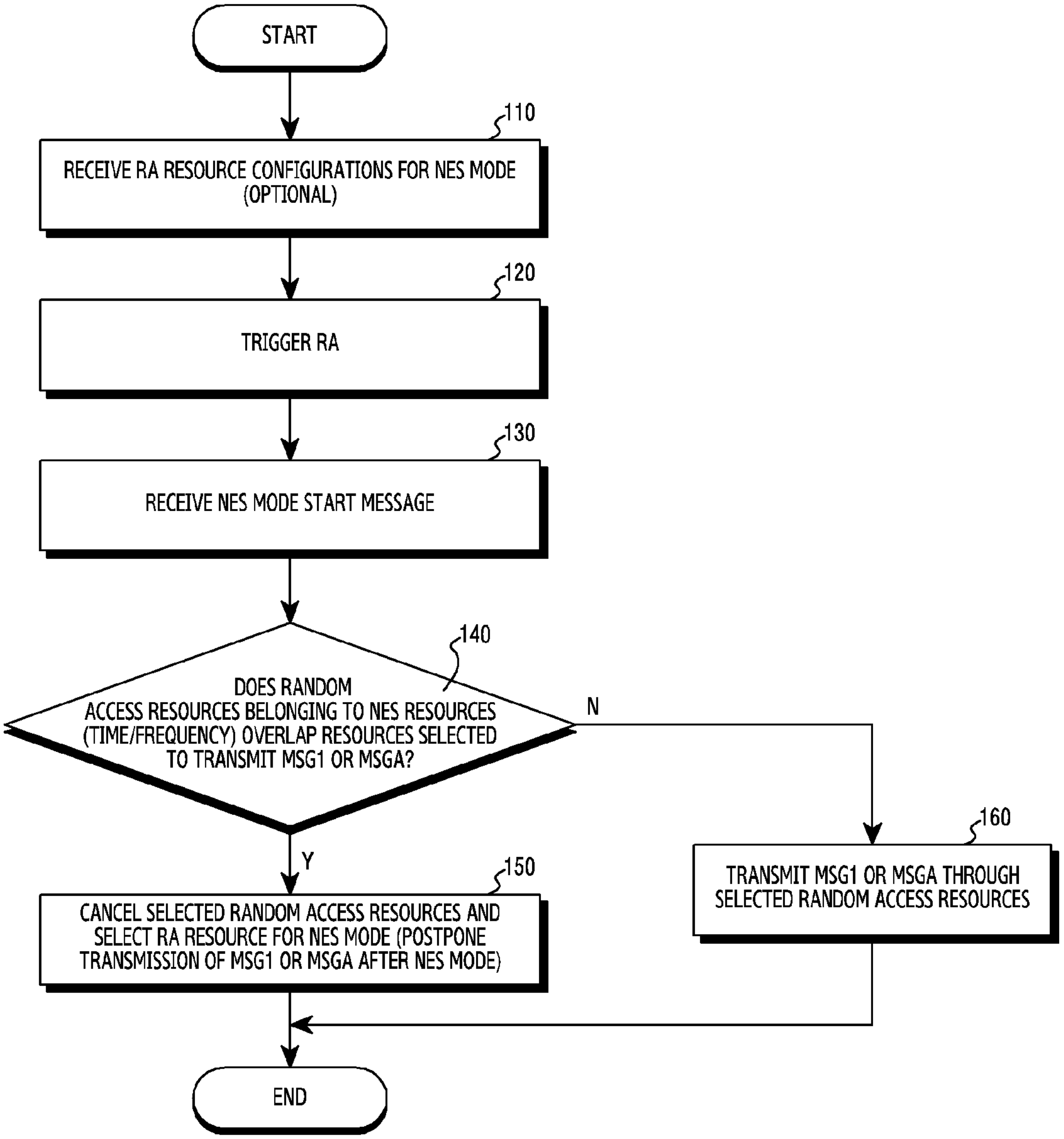
FIG. 1 illustrates a random access procedure when an NES mode is activated according to an embodiment of the disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. Hereinafter, embodiments of the disclosure will be described in detail with reference to the accompanying drawings. The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

In the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

In the following description, the terms "physical channel" and "signal" may be interchangeably used with the term "data" or "control signal". For example, a physical downlink shared channel (PDSCH) is a term referring to a physical channel over which data is transmitted, but the PDSCH may be used to refer to data. That is, in the disclosure, the expression "transmit a physical channel" may be construed as having the same meaning as "transmit data or a signal over a physical channel".

In the following description of the disclosure, higher signaling may mean a signal transmission method in which a base station transmits a signal to an electronic device by using a downlink data channel in a physical layer or an electronic device transmits a signal to a base station by using an uplink data channel in a physical layer. The higher signaling may be understood as radio resource control (RRC) signaling or a media access control (MAC) control element (CE).

In the following description of the disclosure, terms and names defined in the 3rd generation partnership project new radio (3GPP NR) or 3rd generation partnership project long term evolution (3GPP LTE) standards may be used for the sake of descriptive convenience. However, the disclosure is not limited by these terms and names, and may be applied in the same way to systems that conform other standards. In the disclosure, the term "eNB" may be interchangeably used with the term "gNB". That is, a base station described as "eNB" may indicate "gNB". Furthermore, the term "terminal" may refer to a mobile phone, an MTC device, an NB-IoT device, a sensor, and other wireless communication devices.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) (or a mobile station (MS)) transmits data or control signals to a base station (BS) (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

According to some embodiments, eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also may require a design for assigning a large number of resources in a frequency band in order to secure reliability of a communication link.

The above-described three services considered in the 5G communication system, that is, eMBB, URLLC, and mMTC, may be multiplexed and transmitted in a single system. In order to satisfy different requirements of the respective services, different transmission/reception techniques and transmission/reception parameters may be used between the services. However, the above mMTC, URLLC< and eMBB are merely examples of different types of services, and service types to which the disclosure is applied are not limited to the above examples.

Furthermore, in the following description, LTE, LTE-A, LTE Pro, or 5G (or NR or next generation mobile communication) systems will be described by way of example, but the embodiments of the disclosure may also be applied to other communication systems having similar technical backgrounds or channel types. In addition, based on determinations by those skilled in the art, the embodiments of the disclosure may also be applied to other communication systems through some modifications without significantly departing from the scope of the disclosure.

In the disclosure, a "downlink (DL)" refers to a radio link via which a base station transmits a signal to a terminal, and an "uplink (UL)" refers to a radio link via which a terminal transmits a signal to a base station. Furthermore, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" in the embodiments may include one or more processors.

In the following description, the disclosure will be described using terms and names defined in the 5GS and NR standards, which are the latest standards specified by the 3rd generation partnership project long term evolution (3GPP LTE) among the existing communication standards, for the convenience of description. However, the disclosure is not limited by these terms and names, and may be applied in the same way to systems that conform other standards. In particular, the disclosure may be applied to the 3GPP 5GS/NR (5th generation mobile communication standards).

A base station (BS) operating in a network energy saving (NES) mode may be unable to transmit and receive a signal, and thus may have difficulty in supporting a random access procedure of a user equipment (UE). An unspecific UE which is not connected to the BS may also perform a random access procedure for initial access or reaccess. Accordingly, the BS supporting the NES mode may be required to perform the random access at a time point at which transmission and reception are possible in consideration of not only a UE which is connected but also a UE which is not connected.

Therefore, the BS may provide the UE with information on random access resources (for example, physical random access channels (PRACHs) allocated to the time during which transmission and reception of the BS are possible except for the time during which the NES mode is operated.

As an embodiment, when the BS operates in the NES mode, the BS may allocate one or more random access resources which can be separately divided in consideration of the NES mode and inform the UE of the one or more allocated random access resources.

As an embodiment, the BS may allocate one or more random access resources which the BS can receive in a direction of different BS beams (for example, a synchronization signal block (SSB) or a channel state information reference signal (CSI-RS)) and inform the UE of the one or more allocated random access resources.

As an embodiment, the random access resources which can be divided may be random access resources existing in different frequency band in which the BS does not use the NES mode.

As an embodiment, the random access resources which can be divided may be random access resources allocated to specific time and frequency which guarantee that the BS does not use the NES mode.

As an embodiment, the random access resources which can be divided may be periodically allocated time and frequency resources.

As an embodiment, the random access resources which can be divided may be time and frequency resources aperiodically activated by a specific condition (for example, a specific downlink signal of the BS).

The BS may transmit information on random access resources which can be separately divided and can be used in the NES mode to UEs through a downlink signal.

As an embodiment, the BS may insert information (for example, PRACH resource allocation information) on random access resources which can be separately divided and can be used in the NES mode into the downlink signal (for example, an MIB or an SIB) transmitted (or broadcasted) to a plurality of UEs and transmit the downlink signal.

As an embodiment, the BS may insert information (for example, PRACH resource allocation information) on random access resources which can be separately divided and can be used in the NES mode into the downlink signal (for example, RRCReconfig or NESCommand) transmitted to UEs connected within the BS and transmit the downlink signal.

For example, the BS may transmit PRACH resource allocation information which can be used in the NES mode within uplink bandwidth part (BWP) configuration information which can be configured by an RRC message to the UE. The PRACH resource allocation information which can be used in the NES mode may be included in an information element of the uplink BWP configuration information (for example, rach-ConfigCommonNES-r18', 'rach-ConfigCommonIABNES-r18', 'msgA-ConfigCommonNES-r18', or 'rach-ConfigCommonNESTwoStepRA-r18'). IEs which may include the PRACH resource allocation information which can be used in the NES mode may be indicated as shown in [Table 1] to [Table 3] below.

TABLE 1

```
-- TAG-BWP-UPLINKCOMMON-START
BWP-UplinkCommon ::=              SEQUENCE {
   genericParameters                BWP,
   rach-ConfigCommon                SetupRelease { RACH-ConfigCommon }
OPTIONAL,     -- Need M
   pusch-ConfigCommon               SetupRelease { PUSCH-ConfigCommon }
OPTIONAL,     -- Need M
   pucch-ConfigCommon               SetupRelease { PUCCH-ConfigCommon }
OPTIONAL,     -- Need M
   ...,
   [[
   rach-ConfigCommonIAB-r16              SetupRelease { RACH-ConfigCommon }
OPTIONAL,     -- Need M
   rach-ConfigCommonIABNES-r18                 SetupRelease { RACH-ConfigCommon }
OPTIONAL,     -- Need M
   useInterlacePUCCH-PUSCH-r16             ENUMERATED {enabled}
OPTIONAL,     -- Need R
   msgA-ConfigCommon-r16             SetupRelease { MsgA-Con
figCommon-r16 }                              OPTIONAL     -- Cond SpCellOnly2
   msgA-ConfigCommonNES-r18               SetupRelease { MsgA-ConfigCommon-r16 }
OPTIONAL     -- Cond SpCellOnly2
   ]],
...
   rach-ConfigCommonNES-r18              SetupRelease { RACH-ConfigCommon }
OPTIONAL,
}
-- TAG-BWP-UPLINKCOMMON-STOP
```

TABLE 2

```
-- TAG-BWP-UPLINKDEDICATED-START
BWP-UplinkDedicated ::=          SEQUENCE {
   pucch-Config                    SetupRelease { PUCCH-Config }
OPTIONAL,     -- Need M
   pusch-Config                    SetupRelease { PUSCH-Config }
OPTIONAL,     -- Need M
   configuredGrantConfig             SetupRelease { ConfiguredGrantConfig }
OPTIONAL,     -- Need M
   srs-Config                      SetupRelease { SRS-Config }
OPTIONAL,     -- Need M
   beamFailureRecoveryConfig           SetupRelease { BeamFailureRecoveryConfig }
OPTIONAL,     -- Cond SpCellOnly
   ...,
   rach-ConfigCommonNES-r18            SetupRelease { RACH-ConfigCommon }
OPTIONAL,
}
```

TABLE 3

```
-- TAG-MSGACONFIGCOMMON-START
MsgA-ConfigCommon-r16 ::=          SEQUENCE {
  rach-ConfigCommonTwoStepRA-r16       RACH-ConfigCommonTwoStepRA-r16,
  rach-ConfigCommonNESTwoStepRA-r18    RACH-ConfigCommonTwoStepRA-r16,     OPTIONAL
  msgA-PUSCH-Config-r16                MsgA-PUSCH-Config-r16              OPTIONAL --Cond
InitialBWPConfig
}
-- TAG-MSGACONFIGCOMMON-STOP
```

For example, the BS may configure separate PRACH resources which can be used in the NES mode as an IE (for example, 'rack-ConfigBFRNES-r18') for beam failure recovery of the UE. The IE which can configure separate PRACH resources available in the NES mode may be as shown in [Table 4] below.

TABLE 4

```
-- TAG-BEAMFAILURERECOVERYCONFIG-START
BeamFailure RecoveryConfig ::=        SEQUENCE (
  rootSequence Index-BFR                   INTEGER (0..137)
OPTIONAL, -- Need M
  rach-ConfigBFR                      RACH-ConfigGeneric
OPTIONAL, -- Need M
  rach-ConfigBFRNES-r18                  RACH-ConfigGeneric
OPTIONAL, -- Need M
  rsrp-ThresholdSSB                   RSRP-Range
...
```

Random access performed by the UE may be 4-step random access including four signal transmission and reception operations and 2-step random access including two signal transmission and reception operations.

The 4-step random access may be a procedure of transmitting and receiving a total of 4 messages from message (Msg)1 to Msg4. Msg1 may be a random access (RA) preamble which the UE transmits to the BS. Msg2 may be a random access response (RAR) which the BS transmits to the UE. Msg3 may be a message including UE information which the UE transmits to the UE. Msg4 may be a contention resolution message which the BS transmits to the UE.

The 2-step random access may be a procedure of transmitting and receiving a total of 2 messages from MsgA to MsgB. MsgA may include a message including a random access preamble and UE information which the UE transmits to the BS. MsgB may include an RAR and a contention resolution message which the BS transmits to the UE.

When the BS starts operating in the NES mode while the UE and the BS perform random access, the operation of the UE may vary depending on a state of the random access being performed.

FIG. 1 illustrates a random access procedure when an NES mode is activated according to an embodiment of the disclosure.

Referring to FIG. 1, the UE operation in the case in which the NES mode starts or the UE receives an NES mode start message from the BS before a first message is transmitted after random access is triggered may be described. The NES mode start message may include an NES mode command of the BS. In the following embodiments, the first message may be Msg1 or MsgA.

In operation 110, the UE may receive configuration information for random access resources available in the NES mode. The configuration information for the random access resources available in the NES mode may include allocation information of the random access resources available in the NES mode. However, operation 110 may be omitted.

In operation 120, the UE may trigger random access. When the BS operates in a normal mode before entering the NES mode, the UE triggering the random access may measure reference signals (for example, SSB and/or CSI-RS) of the BS. The UE may select random access resources (for example, PRACH resources) having the correlation with a reference signal having the good performance among the measured reference signals. The UE may transmit a first message (for example, Msg1 or MsgA) including a random access preamble to the BS through the selected random access resources. However, the operation of transmitting the first message of the UE may be an operation in the case in which the IVIES mode start message is not received from the BS before the first message is transmitted to the BS.

In operation 130, the UE triggering the random access may trigger the NES mode by the BS (for example, when the NES mode starts or the NES mode start message is received from the BS).

When the BS starts the NES mode in an environment in which the UE triggering the random access exists (for example, when the BS transmits a specific message including NES mode start information to the UE), the UE may determine whether random access resources for the NES mode overlap random access resources for transmitting the first message selected by the UE in operation 140.

When random access resources belonging to NES resources overlap resources for transmitting a random access preamble, the UE may cancel the selected random access resources and select the random access resources for the NES mode in operation 150. That is, the UE may postpone transmission of the first message after the operation of the NES mode of the BS. In the same sense, the UE may use preset random access resources for the NES mode without using normal random access resources according to the start of the NES mode of the BS.

When the random access resources belonging to the NES resources do not overlap the resources for transmitting the random access preamble of the UE, the UE may transmit the first message to the BS by using the selected random access resources in operation 160.

As an embodiment, the UE may not determine whether the random access resources for the NES mode and the transmission of the first message selected by the UE overlap each other. Accordingly, the UE may cancel the selected random access resources and postpone the transmission of the first transmission after the operation of the NES mode. That is, the UE may select random access resources for the NES mode and use preset random access resources for the NES mode without using normal random access resources according to the start of the NES mode of the BS.

As an embodiment, when the BS configures random access resources which do not overlap the NES mode, it is possible to prevent an increase of a collision probability due to overlapping of transmission of the first message by UEs in all or some of the random access resources (for example, random access resources which can be first used after the NES mode ends). The BS may additionally transmit a specific downlink signal or information (for example, a separate back-off parameter to be used in random access resources) to UEs through separate back-off in order to prevent the increase in the collision probability. When receiving the specific downlink signal or information for reducing the collision probability from the BS, the UE may perform additional back-off.

The operation described in FIG. 1 may be used for random access technologies to transmit the first message, such as 4-step random access, 2-step random access, contention-based random access, and contention-free random access.

Figure 2:
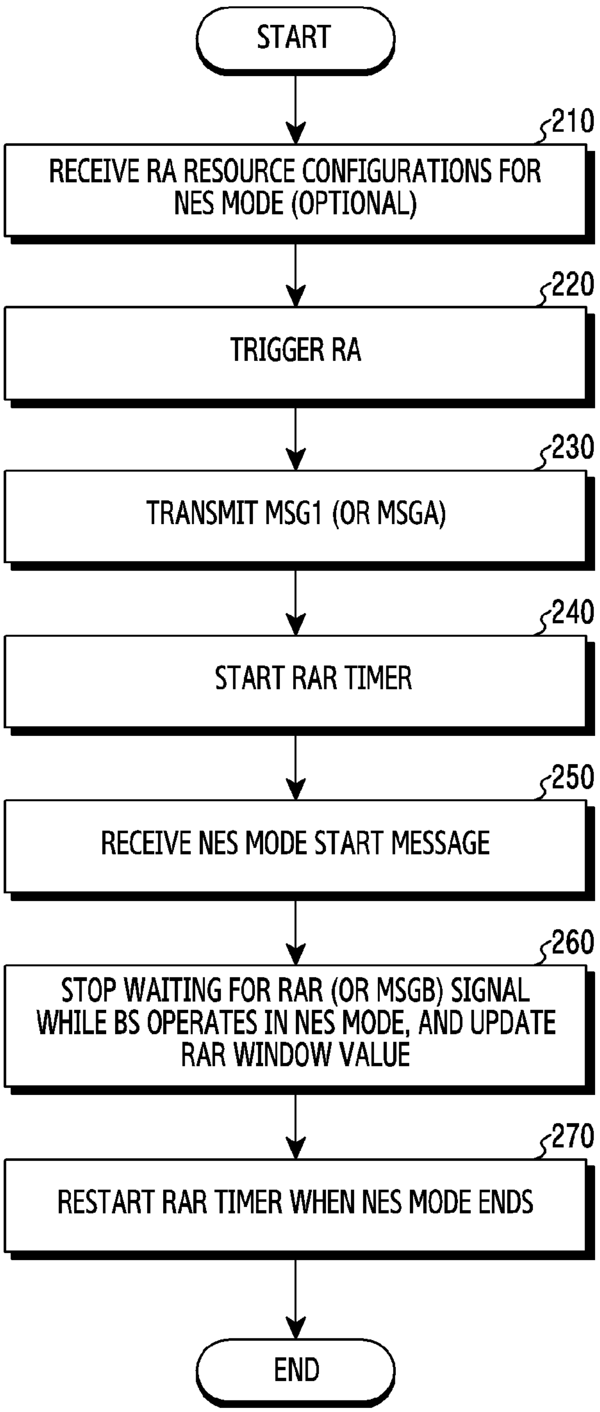
FIG. 2 illustrates a random access procedure when an NES mode is activated according to an embodiment of the disclosure.

FIG. 2 illustrates a random access procedure when an NES mode is activated according to an embodiment of the disclosure.

Referring to FIG. 2, the operation of the UE in the case in which the NES mode starts or the NES mode start message is received from the BS after the UE triggering random access transmits the first message may be described.

In operation 210, the UE may receive configuration information of random access resources available in the NES mode. The configuration information for the random access resources available in the NES mode may include allocation information of the random access resources available in the NES mode. However, operation 210 may be omitted.

In operation 220, the UE may trigger random access. When the BS operates in a normal mode before entering the NES mode, the UE triggering the random access may measure reference signals (for example, SSB and/or CSI-RS) of the BS. The UE may select random access resources (for example, PRACH resources) having the correlation with a reference signal having the good performance among the measured reference signals.

In operation 230, the UE may transmit the first message including a random access preamble to the BS through the selected random access resources.

In operation 240, the UE may run an RAR timer corresponding to an RA response window (RAR-window) or a MsgB response window (MsgB-responsewindow). The RAR-window or the MsgB-responsewindow may be a time length until a second message is received from the BS. When the UE does not receive the second message from the BS until the RAR timer reaches a configured RAR-window or MsgB-responsewindow value, the UE may consider that the corresponding random access attempt has failed. In the following embodiments, the second message may be an RAR or a MsgB.

The NES mode is triggered (for example, the NES mode starts or the NES mode start message is received from the BS) after the UE transmits the first message to the BS in operation 250.

When the UE does not receive the second message (for example, Msg2 or MsgB) from the BS until the NES mode starts, the UE may suspend the RAR timer in operation 260. The UE may suspend the RAR time without expiration of the RAR time while the BS operates in the NES mode. When the BS starts the normal operation after the NES mode ends, the UE may update the RAR-window or the MsgB-responsewindow after the suspension to a new RAR-window or MagB-responsewindow value. In other words, the UE may update the RAR-window or the MsgB-responsewindow in consideration of the NES mode. The updated RAR-window may be a value obtained by adding the RAR-window before the update and the operation time of the NES mode. The updated MsgB-responsewindow may be a value obtained by adding the MsgB-responsewindow before the update and the operation time of the NES mode.

When the BS starts the normal operation after the NES mode ends, the UE may run the RAR time again in operation 270.

As an embodiment, when the NES mode starts after the UE transmits the first message, the UE may suspend the RAR timer until the NES mode ends. When the NES mode ends, the UE may resume the RAR timer.

As an embodiment, when the NES mode starts, the UE may suspend the RAR timer and delete length information of the remaining windows. When the NES mode ends, the UE may start the RAR timer configured by the BS from the beginning.

As an embodiment, the BS may update the RAR-window or the MsgB-responsewindow to a value obtained by adding the operation time of the NES mode thereto. The BS may insert the updated RAR-window or MsgB-responsewindow into the NES mode start message and transmit the NES mode start message to the UE.

As an embodiment, when the NES mode starts or the NES mode start message is received from the BS after the UE transmits the first message to the BS, the UE may consider that the random access procedure has failed. The UE may resume the random access procedure after the NES mode ends. For example, the restart of the random access procedure may mean the start of a new random access procedure. Accordingly, when a new random access procedure starts, the UE may flush the buffer of a third message (for example, process all pieces of data in the buffer), set a PREAMBLE_TRANSMISSION_COUNTER as 1, and initialize a PREAMBLE_POWER_RAMPING_COUNTER as 1. A detailed procedure may follow the medium access control (MAC) standard of 3GPP TS38.321.

As an embodiment, when the NES mode starts or the NES mode start message is received from the BS after the UE transmits the first message to the BS, the UE may consider that the random access procedure has failed and start the procedure from the transmission of the first message (that is, operation 230) after the NES mode ends. At this time, the UE may increase the PREAMBLE_TRANSMISSION_COUNTER by 1, and other configurations and operations may follow the MAC standard of 3GPP TS38.321.

As an embodiment, when the NES mode starts or the NES mode start message is received from the BS after the UE transmits the first message to the BS, the UE may consider that the random access procedure has failed. Further, the UE may resume the procedure from transmission of the first message (that is, operation 230) after the NES mode ends. At this time, the UE may maintain the PREAMBLE_TRANSMISSION_COUNTER, or other configurations and operations may follow the MAC standard of 3GPP TS38.321.

As an embodiment, when there is no random access procedure being performed, the BS may postpone the operation of the NES mode after the end of the random access procedure or attempt being performed without starting the operation of the NES mode.

As an embodiment, the UE may determine whether RAR-window or MsgB-response window resources configured for reception of the second message (for example, RAR or MsgB) are included in random access resources for the NES. The UE may perform the above-described procedures (for example, the procedures after operation 230) when the RAR-window or MsgB-response window resources configured for reception of the second message are included in the random access resources for the NES mode.

As an embodiment, when the UE confirms (or detect or identify) the start of the NES mode (for example, receives the NES mode start message), the UE may perform the procedures (for example, the procedures after operation 260).

The operation described in FIG. 2 may be used for random access technologies to receive the second message (for example, Msg2 or MsgB), such as 4-step random access, 2-step random access, contention-based random access, and contention-free random access.

Figure 3:
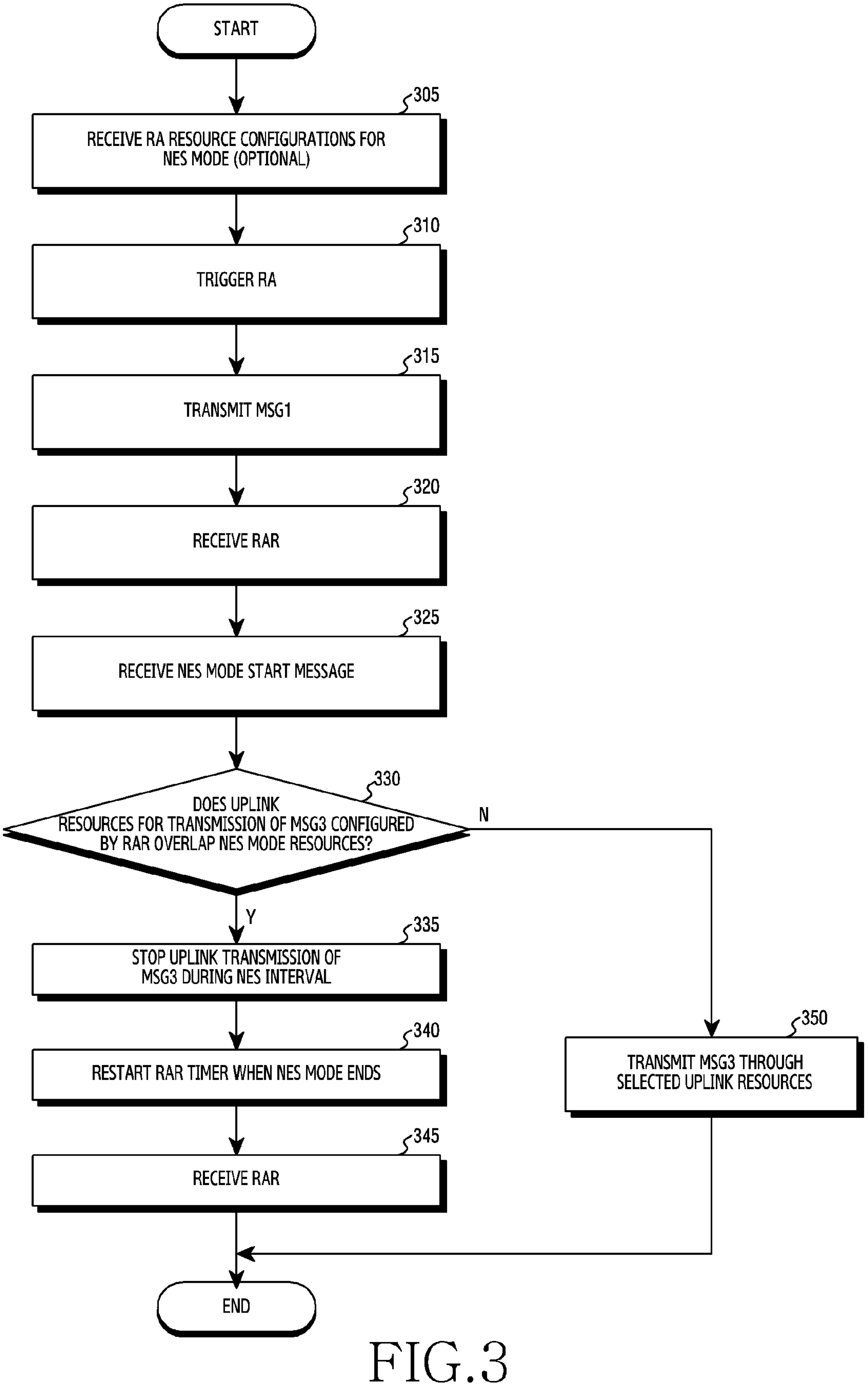
FIG. 3 illustrates a random access procedure when an NES mode is activated according to an embodiment of the disclosure.

FIG. 3 illustrates a random access procedure when an NES mode is activated according to an embodiment of the disclosure.

Referring to FIG. 3, the operation of the UE in the case in which the NES mode starts or the NES mode start message is received from the BS after the UE triggering random access receives the second message from the BS may be described.

In operation 305, the UE may receive configuration information for random access resources available in the NES mode. The configuration information for random access resources available in the NES mode may include allocation information of the random access resources available in the NES mode. However, operation 305 may be omitted.

In operation 310, the UE may trigger random access. When the BS operates in a normal mode before entering the NES mode, the UE triggering the random access may measure reference signals (for example, SSB and/or CSI-RS) of the BS. The UE may select random access resources (for example, PRACH resources) having the correlation with a reference signal having the good performance among the measured reference signals.

In operation 315, the UE may transmit the first message including the random access preamble to the BS through the selected random access resources.

In operation 320, the UE may start the RAR timer. The UE may receive the second message from the BS within the RAR-window or the MsgB-responsewindow.

The NES mode may be triggered (the NES mode starts or the NES mode start message is received from the BS) after the UE receives the second message from the BS in operation 325.

In operation 330, the UE may determine whether random access resources for the NES mode overlap random access resources for transmitting the third message. The random access resources for transmitting the third message selected by the UE may be uplink resources allocated through the second message received from the BS. In the following embodiments, the third message may be Msg3.

When the random access resources for the NES mode overlap the random access resources for transmitting the third message selected by the UE, the UE may stop transmission of the third message (for example, Msg3) that overlap the NES mode resources in operation 335.

After the NES mode ends, the UE may start the RAR time and wait for receiving the second message from the BS in operation 340.

In operation 345, the UE may receive again the second message including new uplink resource allocation information from the BS in order to transmit the third message within the RAR-window.

When the random access resources for the NES mode do not overlap the random access resources for transmitting the third message selected by the UE, the UE may transmit the third message to the BS through the selected uplink resources in operation 350.

As an embodiment, when the random access resources for the NES mode overlap random access resources for transmitting the third message selected by the UE, the UE may consider that the attempt of the random access being performed has failed and start again the random access from transmission of the first message (that is, operation 315) after the NES mode ends. At this time, the UE may increase the PREAMBLE_TRANSMISSION_COUNTER by 1, and other configurations and operations may follow the MAC standard of 3GPP TS38.321.

As an embodiment, when the random access resources for the NES mode overlap random access resources for transmitting the third message selected by the UE, the UE may consider that the attempt of the random access being performed has failed and start again the random access from transmission of the first message (that is, operation 315) after the NES mode ends. At this time, the UE may maintain the PREAMBLE_TRANSMISSION_COUNTER, or other configurations and operations may follow the MAC standard of 3GPP TS38.321.

As an embodiment, when the random access resources for the NES mode overlap random access resources for transmitting the third message selected by the UE, the UE may consider that the current random access procedure has failed and start again the random access procedure from the beginning (for example, operation 305) after the NES mode ends. For example, the restart of the random access procedure may mean the start of a new random access procedure. Accordingly, when a new random access procedure starts, the UE may flush the buffer of the third message (for example, process all pieces of data in the buffer), set a PREAMBLE_TRANSMISSION_COUNTER as 1, and initialize a PREAMBLE_POWER_RAMPING_COUNTER as 1. A detailed procedure may follow the MAC standard of 3GPP TS38.321.

As an embodiment, if the NES mode start message informing of the start of the NES mode is transmitted when the BS starts the NES mode, the BS may transmit the NES mode start message including a new second message to UEs to which the second message previously was transmitted. The new second message may include allocation information of new uplink resources for transmitting the third message to the BS by the UE after the NES mode ends.

As an embodiment, the BS may allocate, to UEs to which the second message was previously transmitted, new uplink resources for transmitting the third message by the UE after the NES mode ends. Information on the uplink resources allocated by the BS may be detected by the BS and the UE through calculations using the existing allocated uplink resources and random access resource configuration information for the NES mode without separate signaling. For example, when a start time (for example, a slot index) of the existing uplink transmission is T, a start time of new uplink transmission may be a value obtained by adding T and the operation time length of the NES mode. Alternatively, the start time of the new uplink transmission may be a value obtained by adding T, the operation time length of the NES mode, and a predetermined offset value. The predetermined offset value may be informed in advance to the UE by the BS through a downlink signal.

As an embodiment, when there is no random access procedure being performed, the BS may postpone the operation of the NES mode after the end of the random access procedure or attempt being performed without starting the operation of the NES mode.

As an embodiment, the UE may determine whether uplink resources allocated for transmission of the third message overlap random access resources for the NES mode and perform the procedures (for example, at least one of the procedures after operation 335) when the uplink resources allocated for transmission of the third message overlap the random access resources for the NES mode.

As an embodiment, when the UE confirms (or detect or identify) the start of the NES mode (for example, receives the NES mode start message), the UE may perform the procedures (for example, the procedures after operation 330).

The operation described in FIG. 3 may be used for random access technologies to transmit the third message such as 4-step random access or contention-based random access.

Figure 4:
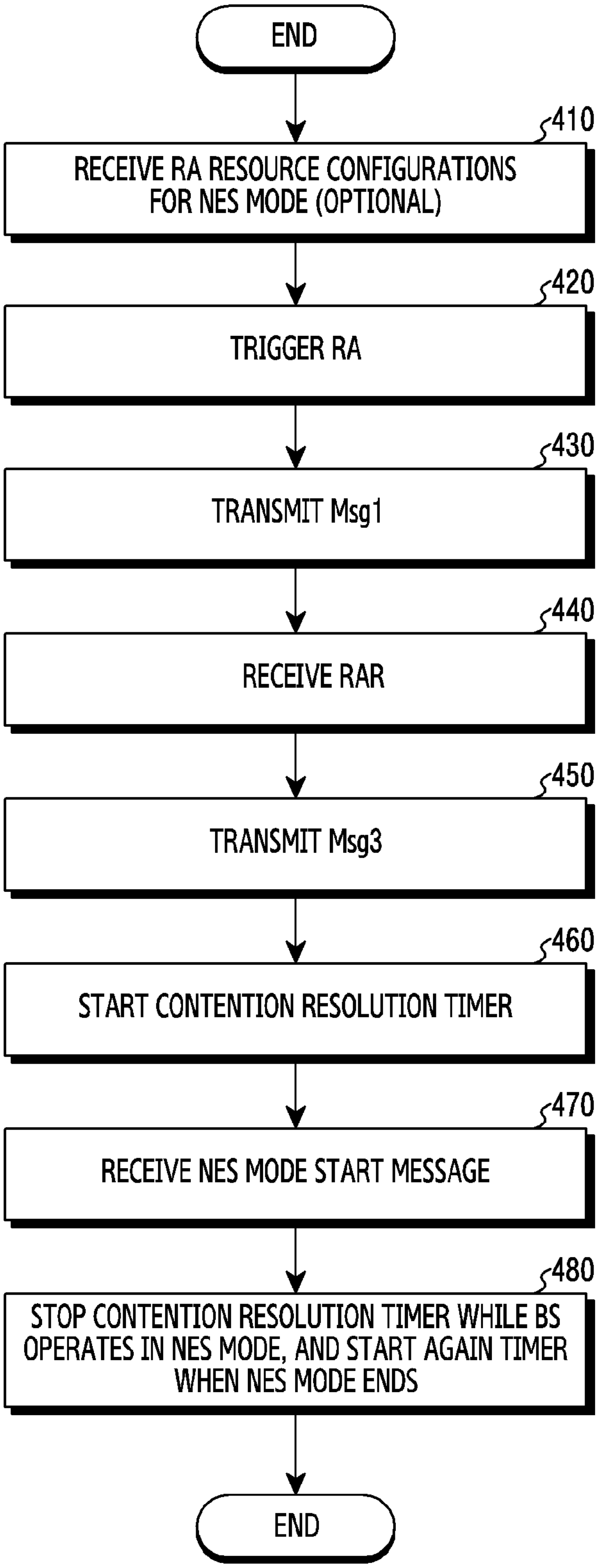
FIG. 4 illustrates a random access procedure when an NES mode is activated according to an embodiment of the disclosure.

FIG. 4 illustrates a random access procedure when the NES mode is activated according to an embodiment of the disclosure.

Referring to FIG. 4, the operation of the UE in the case in which the NES mode starts or the NES mode start message is received from the BS after the UE triggering random access transmits the third message to the BS may be described.

In operation 410, the UE may receive configuration information for random access resources available in the NES mode. The configuration information for random access resources available in the NES mode may include allocation information of the random access resources available in the NES mode. However, operation 410 may be omitted.

In operation 420, the UE may trigger random access. When the BS operates in a normal mode before entering the NES mode, the UE triggering the random access may measure reference signals (for example, SSB and/or CSI-RS) of the BS. The UE may select random access resources (for example, PRACH resources) having the correlation with a reference signal having the good performance among the measured reference signals.

In operation 430, the UE may transmit the first message including the random access preamble to the BS through the selected random access resources.

In operation 440, the UE may start the RAR-window or the MsgB-responsewindow. The UE may receive the second message from the BS within the RAR-window or the MsgB-responsewindow. The BS may allocate uplink resources for transmission of the third message to the UE through the second message.

In operation 450, the UE may transmit the third message to the BS through uplink resources allocated through the second message.

After transmitting the third message, the UE may start the operation of a contention resolution timer in operation 460. The contention resolution timer may be a timer for a reception standby time until a contention resolution signal of a fourth message is received from the BS and may be called 'ra-ContentionResolutionTimer'. In the following embodiments, the fourth message may be Msg4.

After the UE transmits the third message to the BS, the NES mode may be triggered (for example, the NES mode starts or the NES mode start message is received from the BS) in operation 470.

In operation 480, the UE may suspend the operation of the contention resolution timer while the BS operates in the NES mode and may resume the operation of the contention resolution timer after the NES mode ends. As an embodiment, when the NES mode starts, the UE may suspend the contention resolution timer and delete the remaining timer information. Further, after the NES mode ends, the UE may reset the contention resolution timer configured by the BS and resume the reset contention resolution timer.

As an embodiment, when the NES mode starts while the UE waits for receiving a contention resolution signal, the UE may suspend the contention resolution timer while the BS operates in the NEs mode without expiration of the remaining timer of the contention resolution timer. When the BS normally operates after the NES mode ends, the UE may resume the suspended contention resolution timer and wait for receiving the contention resolution signal. In other words, the UE may update the ra-ContentionResolutionTimer in consideration of the NES mode, and the updated ra-ContentionResolutionTimer may be a value obtained by adding the ra-ContentionResolutionTimer before the update and the NES operation time. Further, the BS may insert the updated ra-ContentionResolutionTimer into the NES mode start message and transmit the NES mode start message to the UE.

As an embodiment, when the NES mode starts or the NES mode start message is received from the BS after the UE transmits the third message to the BS, the UE may consider that the random access procedure has failed. Accordingly, the UE may resume the random access procedure after the NES mode ends. For example, the restart of the random access procedure may mean the start of a new random access procedure. Accordingly, when a new random access procedure starts, the UE may flush the buffer of the third message (for example, process all pieces of data in the buffer), set a PREAMBLE_TRANSMISSION_COUNTER as 1, and initialize a PREAMBLE_POWER_RAMPING_COUNTER as 1. A detailed procedure may follow the MAC standard of 3GPP TS38.321.

As an embodiment, when the NES mode starts or the NES mode start message is received from the BS after the UE transmits the third message to the BS, the UE may consider that the attempt of the random access has failed. The UE may start the random access procedure from transmission of the first message (that is, operation 430) after the NES mode ends. At this time, the UE may increase the PREAMBLE_TRANSMISSION_COUNTER by 1, and other configurations and operations may follow the MAC standard of 3GPP TS38.321.

As an embodiment, when the NES mode starts or the NES mode start message is received from the BS after the UE transmits the third message to the BS, the UE may consider that the attempt of the random access has failed. The UE may start the random access procedure from transmission of the first message (that is, operation 430) after the NES mode ends. At this time, the UE may maintain the PREAMBLE_TRANSMISSION_COUNTER, and other configurations and operations may follow the MAC standard of 3GPP TS38.321.

As an embodiment, when there is a random access procedure being performed, the BS may postpone the operation of the NES mode after the end of the random access procedure or attempt being performed without starting the operation of the NES mode.

The operation described in FIG. 4 may be used for random access technologies to receive the fourth message such as 4-step random access or contention-based random access.

Figure 5:
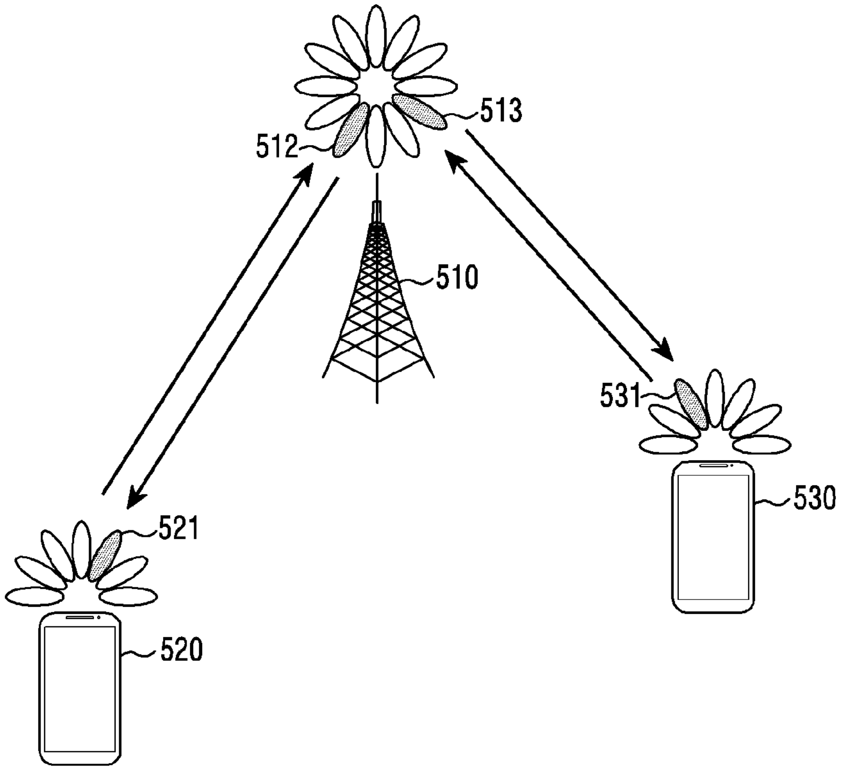
FIG. 5 illustrates a wireless communication system according to various embodiments of the disclosure.

FIG. 5 illustrates a wireless communication system according to various embodiments of the disclosure. FIG. 5 illustrates a BS 510, a UE 520, and a UE 530 as the part of nodes using a radio channel in a wireless communication system. Although FIG. 5 illustrates only one BS, other BSs which are the same as or similar to the BS 510 may be further included.

The BS 510 is a network infrastructure element that provides radio access to the UEs 520 and 530. The BS 510 has coverage defined in a predetermined geographical area on the basis of the range within which a signal can be transmitted. The BS 510 may be referred to as an "access point (AP)", an "eNodeB (eNB)", a "5$^{th}$-generation (5G) node", a "gNodeB (next generation node B (gNB))", a "wireless point", or a "transmission/reception point (TRP)", or using another term having a technical meaning equivalent thereto, as well as "base station".

Each of the UE 520 and the UE 530 is a device used by a user and communicates with the BS 510 through a radio channel. Depending on circumstances, at least one of the UE 520 and the UE 530 may be operated without any involvement by the user. That is, at least one of the UEs 520 and 530 may be a device that performs machine-type communication (MTC), and may not be carried by the user. Each of the UE 520 and the UE 530 may be referred to as a "user equipment (UE)", "mobile station", "subscriber station", "remote terminal", "wireless terminal", or "user device", or using another term having an equivalent technical meaning, as well as "terminal".

The BS 510, the terminal 520, and the UE 530 may transmit and receive a wireless signal in millimeter-wave (mmWave) bands (for example, 28 GHz, 30 GHz, 38 GHz, and GHz). At this time, in order to increase a channel gain, the BS 510, the UE 520, and the UE 530 may perform beamforming. The beamforming may include transmission beamforming and reception beamforming. That is, the BS 510, the UE 520, and the UE 530 may assign directivity to a transmission signal or a reception signal. To this end, the BS 510 and the UEs 520 and 530 may select serving beams 512, 513, 521, and 531 through a beam search procedure or beam management procedure. After the serving beams 512, 513, 521, and 531 are selected, communication may be performed through resources having a quasi-co-located (QCL) relationship with resources through which the serving beams 512, 513, 521, and 531 are transmitted.

If the large-scale characteristics of a channel for transmitting symbols through a first antenna port can be inferred from a channel for transmitting symbols through a second antenna port, the first antenna port and the second antenna port may be evaluated to have a QCL relationship therebetween. For example, the large-scale characteristics may include at least one of delay spread, Doppler spread, Doppler shift, average gain, average delay, and spatial receiver parameters.

Figure 6:
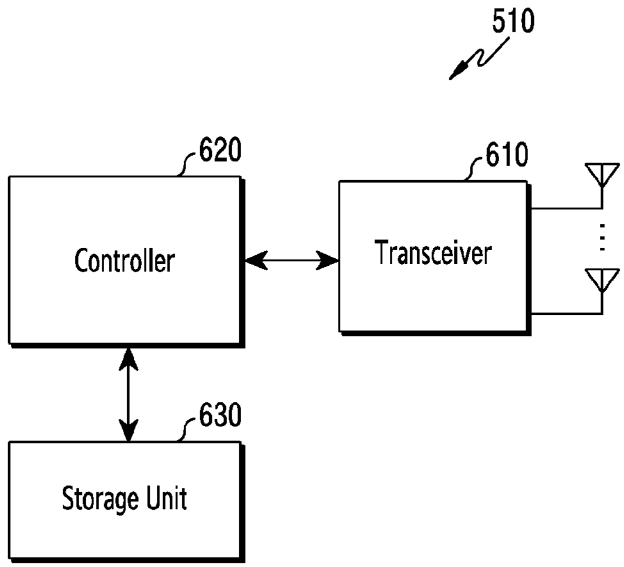
FIG. 6 illustrates the structure of a BS according to an embodiment of the disclosure.

FIG. 6 illustrates the structure of a BS according to an embodiment of the disclosure.

The configuration illustrated in FIG. 6 may be understood as the configuration of the BS 510. The term "unit" or "—er" used hereinafter may mean the unit of processing at least one function or operation, which may be implemented by hardware, software, or a combination of hardware and software.

Referring to FIG. 6, the BS 510 may include a transceiver 610, a processor 620, and a memory 630. The transceiver 610, the processor 620, and the memory 630 may operate according to a communication method of the BS 510. A network device may also correspond to the structure of the BS 510. However, elements of the BS 510 are not limited to the above example. For example, the BS 510 may include elements more or fewer than the above-described elements. For example, the BS 510 may include the transceiver 610 and the processor 620. Further, the transceiver 610, the processor 620, and the memory 630 may be implemented in the form of a single chip.

The transceiver 610 collectively refers to a receiver of the BS 510 and a transmitter of the BS, and may transmit and receive a signal to and from other BSs or other network devices. At this time, the transmitted and received signals may include control information and data. The transceiver 610 may transmit, for example, system information to the UE and transmit a synchronization signal or a reference signal. To this end, the transceiver 610 may include an RF transmitter for up-converting and amplifying a frequency of a transmitted signal and an RF receiver for low-noise amplifying a received signal and down-converting the frequency. However, this is only an embodiment of the transceiver 610, and elements of the transceiver 610 are not limited to the RF transmitter and the RF receiver. The transceiver 610 may include a wired/wireless transceiver and include various elements for transmitting and receiving signals. Further, the transceiver 610 may receive a signal through a communication channel (for example, a radio channel), output the signal to the processor 620, and transmit the signal output from the processor 620 through the communication channel. In addition, the transceiver 610 may receive a communication signal, output the communication signal to the processor, and transmit the signal output from the processor to the UE, another BS, or another entity through a wired/wireless network.

The memory 630 may store programs and data required for the operation of the BS 510. Further, the memory 630 may store control information or data included in the signal acquired by the BS 510. The memory 630 may be configured by storage media such as ROM, RAM, hard disc, CD-ROM, and DVD, or a combination of the storage media. The memory 630 may store at least one piece of information transmitted and received through the transceiver 610 and information generated through the processor 620.

In the disclosure, the processor 620 may be defined as a circuit, an application-specific integrated circuit, or at least one processor. The processor may include a communications processor (CP) that performs control for communication, and an application processor (AP) that controls higher layers such as an application program. The processor 620 may control the overall operation of the BS 510 according to an embodiment proposed in the disclosure. For example, the processor 620 may control a signal flow between blocks to perform the operation according to the above-described flowchart.

Figure 7:
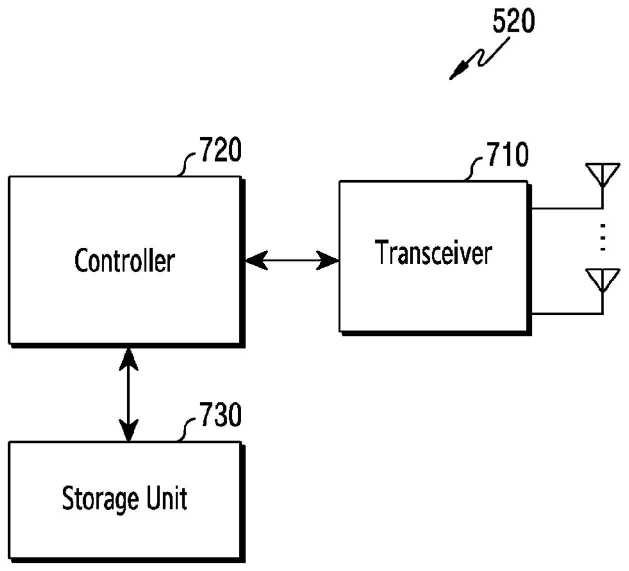
FIG. 7 illustrates the structure of a UE according to an embodiment of the disclosure.

FIG. 7 illustrates the structure of a UE according to an embodiment of the disclosure.

Referring to FIG. 7, the UE 520 may include a transceiver 710, a processor 720, and a memory 730. The transceiver 710, the processor 720, and the memory 730 may operate according to a communication method of the UE. However, the elements of the UE 520 are not limited thereto. For example, the UE 520 may include more elements or fewer elements than the above-described elements. For example, the UE 520 may include the transceiver 710 and the processor 720. Further, the transceiver 710, the processor 720, and the memory 730 may be implemented in the form of a single chip.

The transceiver 710 collectively refers to a receiver of the UE 520 and a transmitter of the UE 520 and may transmit and receive a signal to and from other UEs or network entities. The signal transmitted and received to and from the BS 510 may include control information and data. The transceiver 710 may receive system information from, for example, the BS 510 and may receive a synchronization signal or a reference signal. To this end, the transceiver 710 may include an RF transmitter for up-converting and amplifying a frequency of a transmitted signal and an RF receiver for low-noise amplifying a received signal and down-converting the frequency. However, this is only an embodiment of the transceiver 710, and elements of the transceiver 710 are not limited to the RF transmitter and the RF receiver. The transceiver 710 may include a wired/wireless transceiver and various elements for transmitting and receiving a signal. The transceiver 710 may receive a signal through a radio channel, output the signal to the processor 720, and transmit the signal output from the processor 720 through the radio channel. The transceiver 710 may receive a communication signal, output the communication signal to the processor, and transmit the signal output from the processor to a network entity through a wired/wireless network.

The memory 730 may store programs and data required for the operation of the UE 520. The memory 730 may store control information or data included in the signal acquired by the UE 520. The memory 730 may be configured by storage media such as ROM, RAM, hard disc, CD-ROM, and DVD, or a combination of the storage media.

In the disclosure, the processor 720 may be defined as a circuit, an application-specific integrated circuit, or at least one processor. The processor may include a communications processor (CP) that performs control for communication, and an application processor (AP) that controls higher layers such as an application layer. The processor 720 may control the overall operation of the UE 520 according to an embodiment proposed in the disclosure. For example, the processor 720 may control a signal flow between blocks to perform the operation according to the above-described flowchart.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, a digital versatile disc (DVD) or other optical storage device, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the specific embodiments of the disclosure, the components included in the disclosure are expressed in a singular or plural form. However, the singular or plural expression is appropriately selected according to a proposed situation for the convenience of explanation, the disclosure is not limited to a single component or a plurality of components, the components expressed in the plural form may be configured as a single component, and the components expressed in the singular form may be configured as a plurality of components.

Meanwhile, while the specific embodiment has been described in the explanations of the disclosure, it will be noted that various changes may be made therein without departing from the scope of the disclosure. Therefore, the scope of the disclosure is not limited and defined by the described embodiment and is defined not only the scope of the claims as below but also their equivalents.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Furthermore, although the above embodiments have been presented based on the FDD LTE system, other variants based on the technical idea of the above embodiments may also be implemented in other systems such as TDD LTE, 5G, or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in methods of the disclosure, some or all of the contents of each embodiment may be implemented in combination without departing from the essential spirit and scope of the disclosure.

Various embodiments of the disclosure have been described above. The above description of the disclosure is merely for the sake of illustration, and embodiments of the disclosure are not limited to the embodiments set forth herein. Those skilled in the art will appreciate that the disclosure may be easily modified and changed into other specific forms without departing from the technical idea or essential features of the disclosure. Therefore, the scope of the disclosure should be determined not by the above detailed description but by the appended claims, and all modification sand changes derived from the meaning and scope of the claims and equivalents thereof shall be construed as falling within the scope of the disclosure.

What is claimed is:

1. A method performed by a user equipment (UE) in a wireless communication system, the method comprising:

receiving, from a base station, configuration information related to a network energy saving (NES) mode;

receiving, from the base station, an NES mode start message after a random access (RA) is triggered; and identifying whether at least one resource related to the RA and the NES mode overlap based on the configuration information.

2. The method of claim 1, further comprising:

selecting at least one resource related to the NES mode, in case that the NES mode start message is received before a first message is transmitted to the base station, wherein the first message includes an RA preamble or radio resource control (RRC) connection request.

3. The method of claim 1, further comprising:

interrupting a window for receiving a second message, in case that the NES mode start message is received before the second message is received from the base station, wherein the second message includes an RA response (RAR).

4. The method of claim 1, further comprising:

interrupting a timer for receiving a third message, in case that the NES mode start message is received before the third message is received from the base station, wherein the third message includes information on contention resolution.

5. The method of claim 1, wherein the configuration information related to the NES mode is configured from at least one of a broadcast signal or an RRC signal.

6. A method performed by a base station in a wireless communication system, the method comprising:

transmitting, to a user equipment (UE), configuration information related to a network energy saving (NES) mode; and transmitting, to the UE, an NES mode start message after a random access (RA) is triggered, wherein at least one resource related to the RA and the NES mode overlap is identified based on the configuration information.

7. The method of claim 6, wherein at least one resource related to the NES mode is selected, in case that the NES mode start message is transmitted before a first message is received from the UE, and wherein the first message includes an RA preamble or radio resource control (RRC) connection request.

8. The method of claim 6, wherein a window for receiving a second message is interrupted, in case that the NES mode start message is transmitted before the second message is transmitted to the UE, and wherein the second message includes an RA response (RAR).

9. The method of claim 6, wherein a timer for receiving a third message is interrupted, in case that the NES mode start message is transmitted before the third message is transmitted to the UE, and wherein the third message includes information on contention resolution.

10. The method of claim 6, wherein the configuration information related to the NES mode is configured from at least one of a broadcast signal or an RRC signal.

11. A user equipment (UE) in a wireless communication system, the UE comprising:

a transceiver; and at least one processor operably coupled with the transceiver, wherein the transceiver is configured to:

receive, from a base station, configuration information related to a network energy saving (NES) mode; and receive, from the base station, an NES mode start message after a random access (RA) is triggered, and wherein the at least one processor is configured to:

identify whether at least one resource related to the RA and the NES mode overlap based on the configuration information.

12. The UE of claim 11, wherein the at least one processor is further configured to:

select at least one resource related to the NES mode, in case that the NES mode start message is received before a first message is transmitted to the base station, wherein the first message includes an RA preamble or radio resource control (RRC) connection request.

13. The UE of claim 11, wherein the at least one processor is further configured to:

interrupt a window for receiving a second message, in case that the NES mode start message is received before the second message is received from the base station, wherein the second message includes an RA response (RAR).

14. The UE of claim 11, wherein the at least one processor is further configured to:

interrupt a timer for receiving a third message, in case that the NES mode start message is received before the third message is received from the base station, wherein the third message includes information on contention resolution.

15. The UE of claim 11, wherein the configuration information related to the NES mode is configured from at least one of a broadcast signal or an RRC signal.

16. A base station in a wireless communication system, the base station comprising:

at least one processor; and a transceiver operably coupled to the at least one processor, the transceiver configured to:

transmit, to a user equipment (UE), configuration information related to a network energy saving (NES) mode; and transmit, to the UE, an NES mode start message after a random access (RA) is triggered, wherein at least one resource related to the RA and the NES mode overlap is identified based on the configuration information.

17. The base station of claim 16, wherein at least one resource related to the NES mode is selected, in case the NES mode start message is transmitted before a first message is received from the UE, and wherein the first message includes an RA preamble or radio resource control (RRC) connection request.

18. The base station of claim 16, wherein a window for receiving a second message is interrupted, in case that the NES mode start message is transmitted before the second message is transmitted to the UE, and wherein the second message includes an RA response (RAR).

19. The base station of claim 16, wherein a timer for receiving a third message is interrupted, in case that the NES mode start message is transmitted before the third message is transmitted to the UE, and wherein the third message includes information on contention resolution.

20. The base station of claim 16, wherein the configuration information related to the NES mode is configured from at least one of a broadcast signal or an RRC signal.

* * * * *